Sept. 24, 1957  N. L. DAVIS  2,807,366
MINERAL SEPARATING DEVICE AND METHOD
Filed Oct. 27, 1950  7 Sheets-Sheet 1

Inventor
Nelson L. Davis
by Parker & Carter
Attorneys

Sept. 24, 1957  N. L. DAVIS  2,807,366
MINERAL SEPARATING DEVICE AND METHOD
Filed Oct. 27, 1950  7 Sheets-Sheet 2

Inventor
Nelson L. Davis
by Parker & Carter
Attorneys.

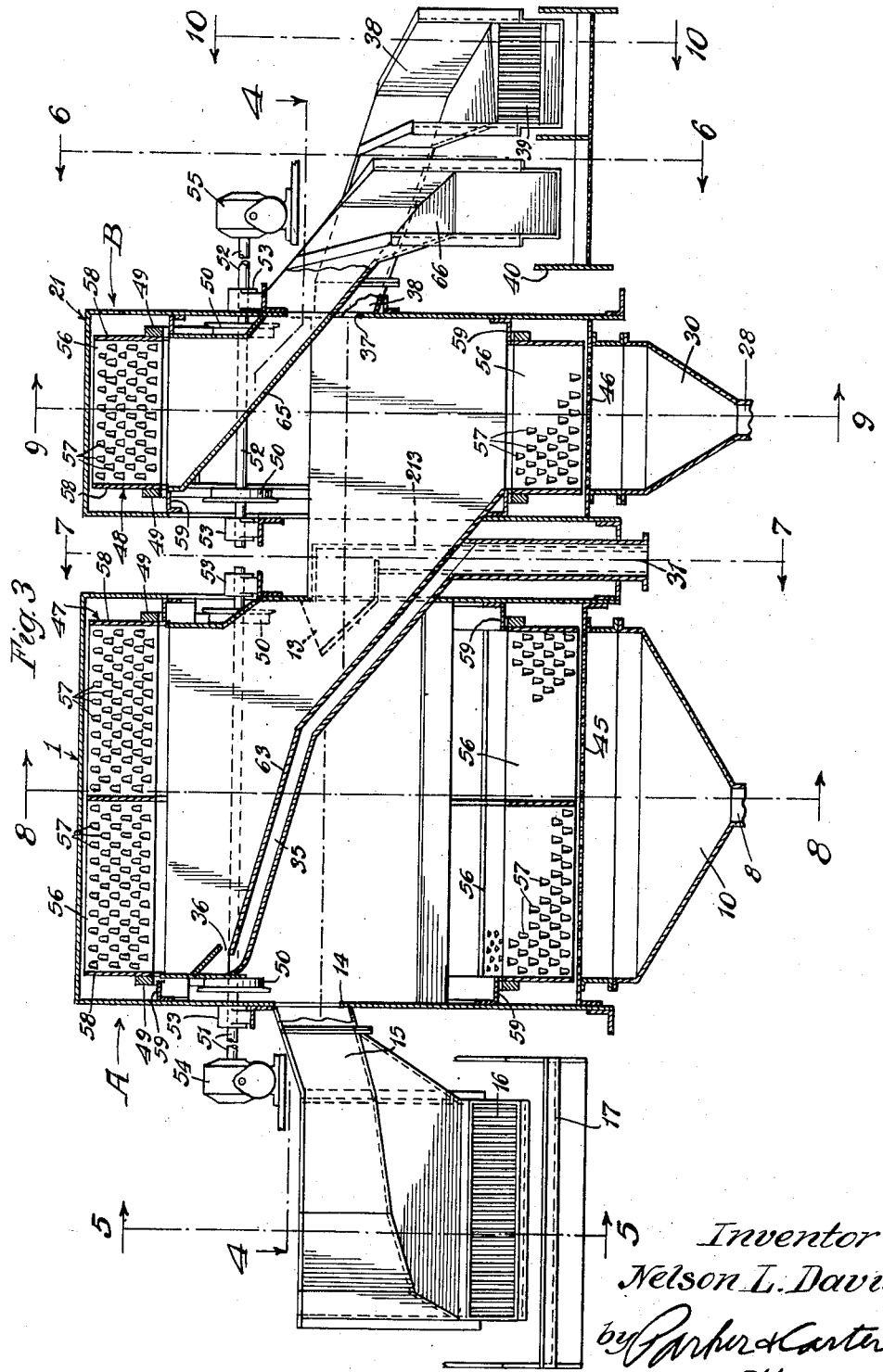

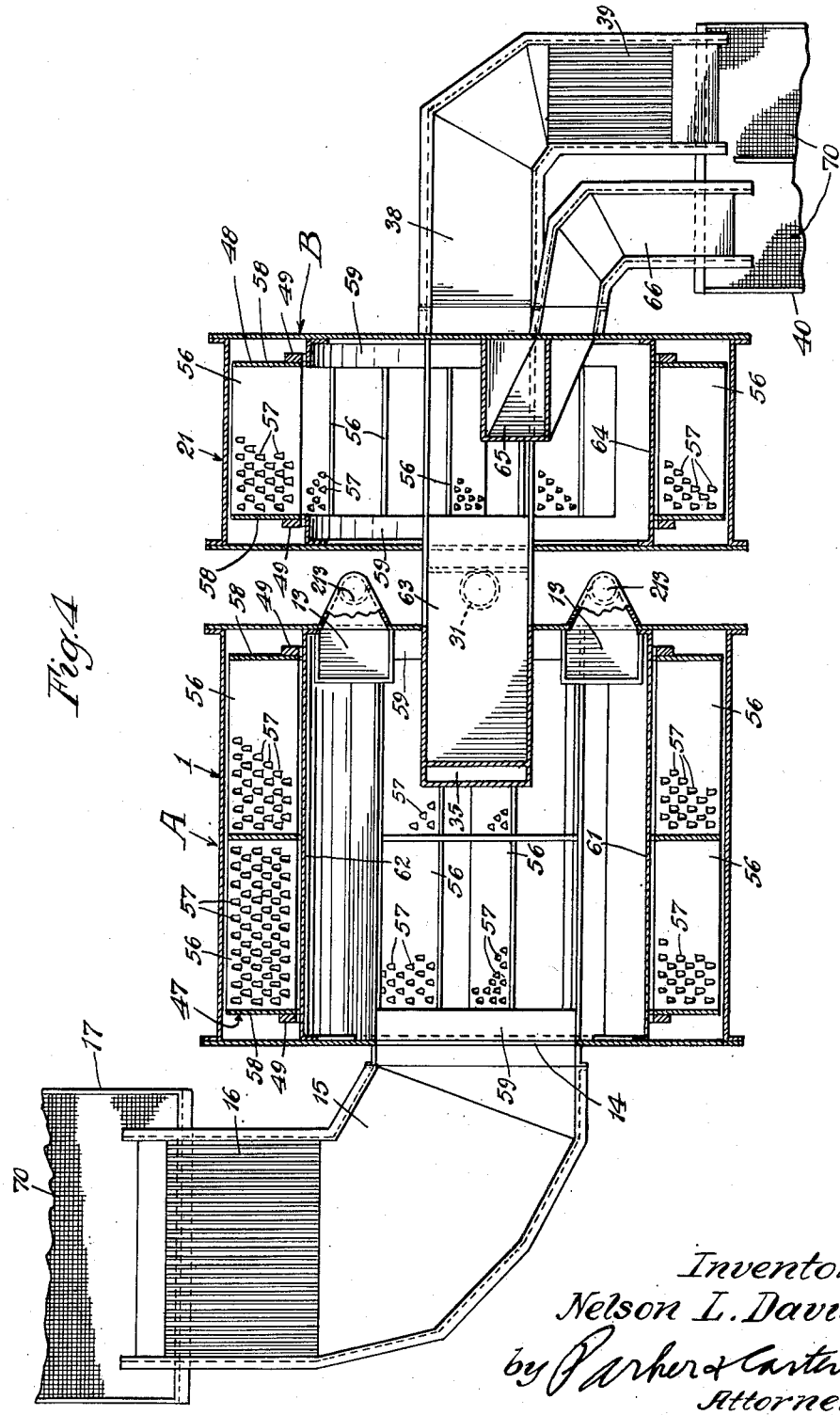

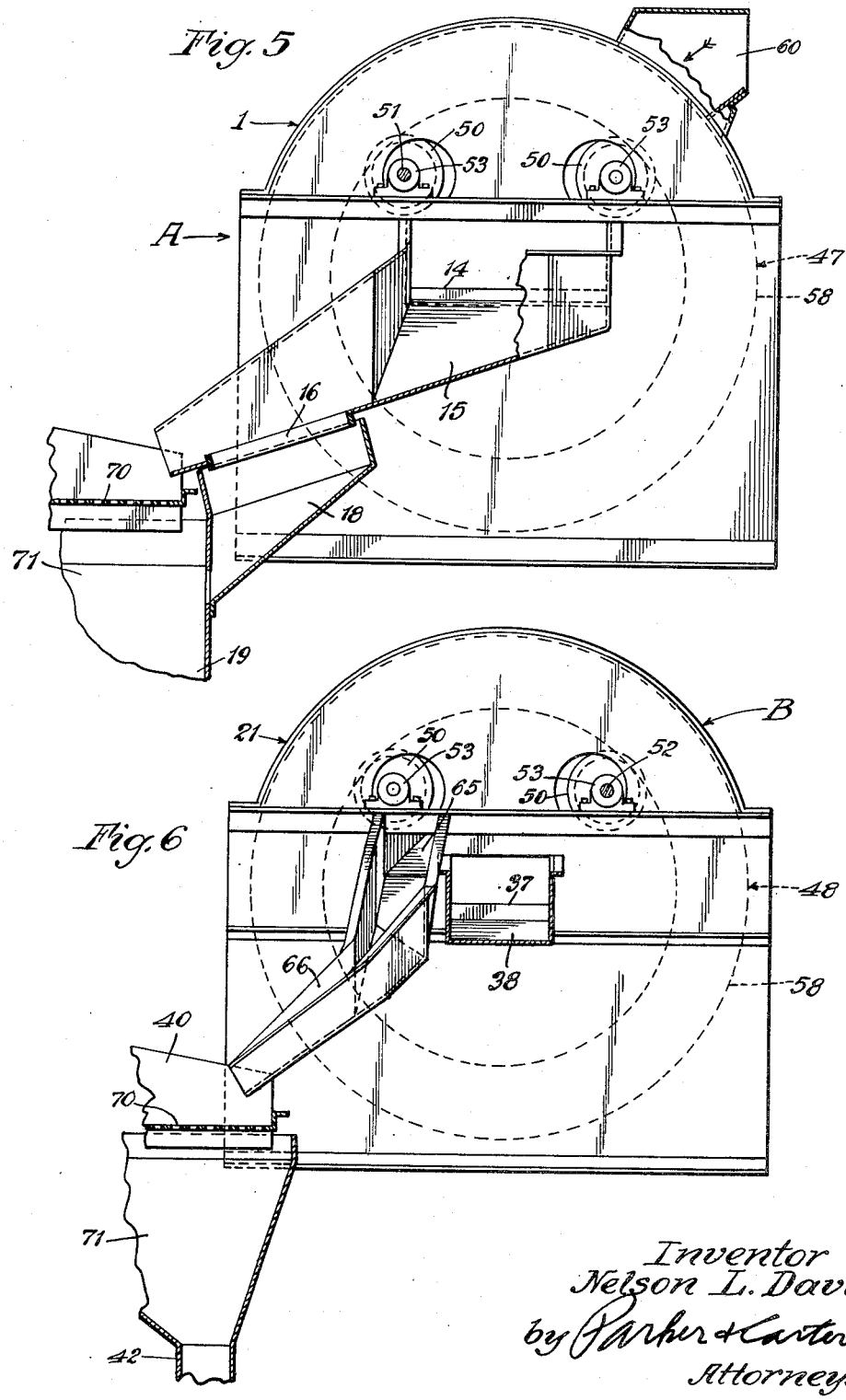

Sept. 24, 1957 N. L. DAVIS 2,807,366
MINERAL SEPARATING DEVICE AND METHOD
Filed Oct. 27, 1950 7 Sheets-Sheet 6
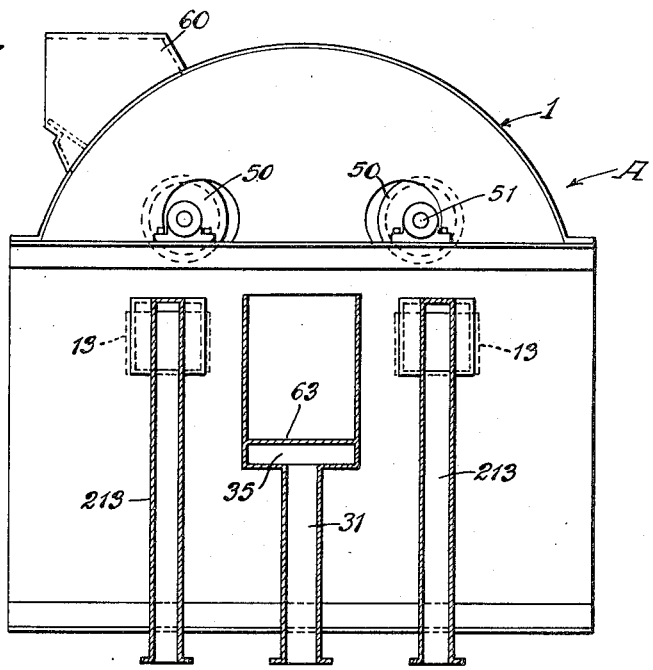
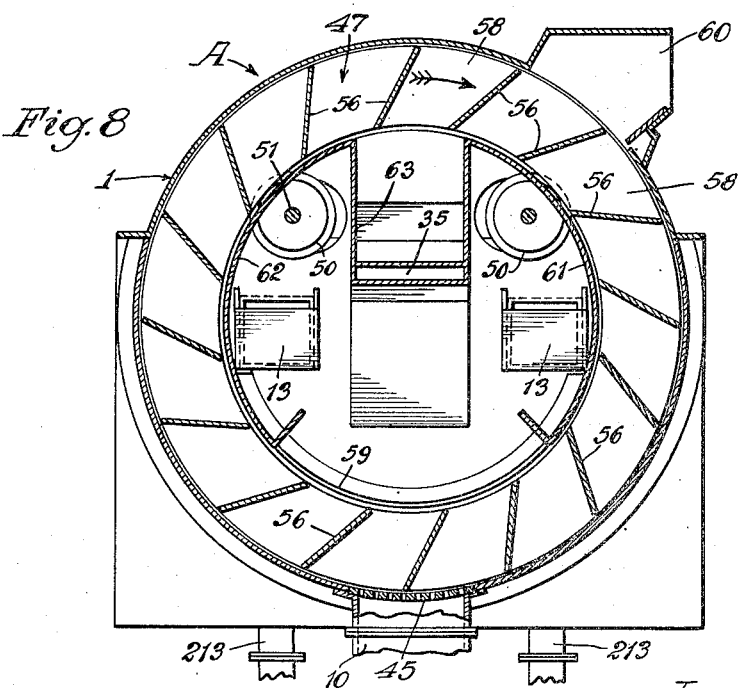
Inventor
Nelson L. Davis
by Parker & Carter
Attorneys

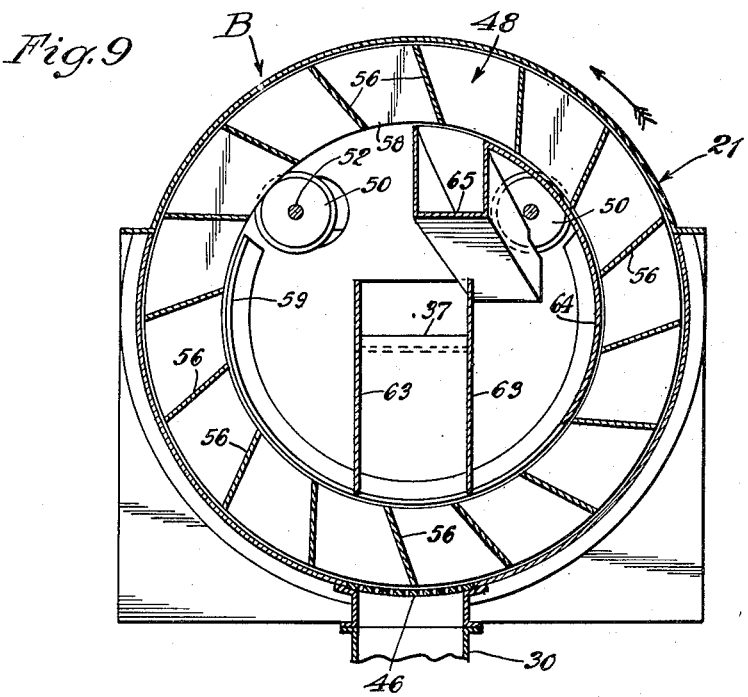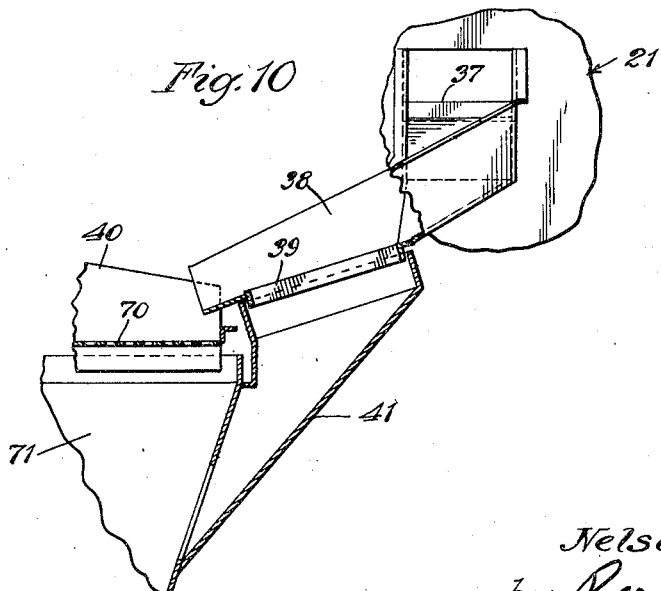

United States Patent Office 2,807,366
Patented Sept. 24, 1957

2,807,366

MINERAL SEPARATING DEVICE AND METHOD

Nelson L. Davis, Chicago, Ill.

Application October 27, 1950, Serial No. 192,573

7 Claims. (Cl. 209—173)

My invention relates to mineral separating or ore dressing devices and has for one object to provide a float and sink separating apparatus which will produce three products.

Another object of my invention is to arrange a plurality of float and sink vessels in tandem so that while each vessel produces two different products, the combined apparatus will produce at least three finished products.

Another object of my invention is to provide a sink and float system, apparatus and method wherein, although each separate vessel produces two products only, more than two final products may be obtained from the entire apparatus.

The general type of vessels used in my present apparatus are disclosed in my United States Letters Patent No. 2,516,962 issued August 1, 1950 and No. 2,521,152 issued September 5, 1950.

In general, my apparatus includes a vessel, to which material to be separated by a sink and float process is fed, the float material from that vessel is discharged as a finished product, the sink material is fed directly without intermediate treatment, to a second vessel and float and sink products are separately discharged from the second vessel.

A suspension medium, and it may for example be water with solids in suspension therein or perhaps a heavy liquid is used in each vessel. The first vessel contains a relatively low density suspension, and the second vessel a relatively high density suspension, and the suspension in each vessel is separately circulated and controlled.

If more than three separate products were desired, more than two vessels might be used, but as a general rule two vessels giving three products, a light product, a medium product or middlings and a heavy product, are sufficient.

As applied to the coal mining industry, the light product is the purest coal, the heavy product is the refuse and the intermediate product is the coal of somewhat less purity than the light product.

My apparatus is especially important in the production of metallurgical coal which must be of maximum purity. The intermediate product may well be used for steam coal but is not sufficiently pure for metallurgical purposes and the heavy refuse is wasted as usual.

The system is likewise important where coal, as mined, contains portions which are laminated with slate or other impurities which cause an increase of specific gravity that will cause them to sink in a parting liquid that will float the purer coal, yet to float on the surface of a heavier parting liquid that allows rock or slate to sink. Thus this so called middlings product is recovered as a separate product that can be crushed to free the coal from its impurities and be recovered by retreatment in my process.

In my system, the first vessel through which all the material must pass is of relatively large capacity. It contains a parting liquid of relatively low specific gravity and only the lightest, purest coal floats to the surface and is discharged over the weir as a finished product. The heavy coal and refuse which sinks to the bottom of the vessel is, without further treatment, discharged directly into a second vessel of smaller capacity containing a parting liquid of higher specific gravity. The float and sink separation is repeated in the second vessel and so heavier, less pure, coal of higher specific gravity floats on the surface and is discharged over the weir from the second vessel as a middlings product. The heavy material sinks to the bottom of the second vessel and is discharged as refuse. If desired, a third vessel might be used containing a parting liquid of even higher specific gravity and a further float and sink separation of the sink from the second vessel might be accomplished. The point is that by using a plurality of vessels, the specific gravity of the parting liquid in each vessel being higher than that of the preceding vessel, it is possible to obtain a float and sink separation in each vessel and as a result to obtain always one more product that the number of vessels because while each vessel in the system, except the last one, produces two products, only one product is discharged as a finished product. But in the last vessel, both products are discharged as finished products.

The relative densities of the parting liquids and the relative capacities of the successive vessels depend, of course, on the character of the material being treated. In the illustration given, dealing with coal where usually the refuse is smaller in quantity than the coal, the second vessel may be of substantially smaller capacity than the first. On the other hand, if the float material was only a small proportion of the material fed to the vessel, then the relative sizes of the two vessels might be reversed.

My apparatus and process is especially well adapted for use of magnetic heavy media consisting for example of finely divided magnetite, flue dust or the like which is kept in suspension in water and so increases the specific gravity of the suspension as to permit an effective float and sink separation.

The float coal is discharged from the primary vessel in the stream which continuously flows over the weir. Most of the medium drains through sieves and is returned directly to the recirculating system. The rest of the medium remaining on the surface of the float coal is rinsed from it by water sprays. The rinsings pass through a drainage screen and the magnetic media are recovered by magnets and restored directly and at once to the recirculating system.

The sink material in the primary vessel is raised and drained by a wheel or other suitable elevating means from the bottom of the vessel and is discharged directly into the secondary vessel. Since such material is mechanically raised above the level of the liquid, the only loss of media at that point is that which adheres to the sink material being fed to the secondary vessel. There is thus a continuous loss of some media from the low density primary vessel in connection with the discharge of both the sink and float material. This loss, unless constantly restored might result in a dangerous decrease in the specific gravity of the suspension but because the loss is slight and because it is accompanied with some loss of the liquid itself, it can easily be compensated for by adding to the low specific gravity suspension in the primary vessel, controlled amounts of the high specific gravity suspension from the secondary vessel.

The sink material from the primary vessel is then delivered to the surface of the bath of parting liquid of the vessel. Some of that material, heavy enough to sink in the first vessel, floats in the second because of the higher specific gravity of the suspension. Such float material is discharged over the weir with the medium. The sink material in the second vessel is raised above the surface of the suspension mechanically and is discharged from the system. Both discharges from the last vessel in the system, that is, the float material that passes over the weir and the sink material that is mechanically raised above the liquid, pass over sieves which permit most of the medium to drain and be returned directly to the medium recirculating system. The medium retained on the surfaces of the float and sink products are rinsed from them by water sprays and the rinsings are processed by a magnetic separator which recovers the magnetite and restores it to the medium in recirculation.

Since the specific gravity in the vessels differs, a separate circulation system is required for each vessel and the circulation systems must be kept entirely separate except for the control supply of suspension from a vessel containing relatively high gravity suspension to a vessel containing a suspension of relatively low specific gravity.

Only the material discharged as a final product from the system is drained and washed. As above indicated, it is possible to maintain the specific gravity of the suspension in each vessel constant by the addition of raw magnetite only in the vessel containing suspension of highest specific gravity. However, circumstances may arise under which it is desirable to supply raw magnetite direct to any one or all of the separate circulation systems and so I provide raw magnetite supply means for each of such systems making it possible for the operator to adjust the specific gravity of the suspension in each system either by the addition of magnetite direct to that system, or by supplying to the system, suspension of a higher specific gravity.

My invention is illustrated more or less diagrammatically in the accompanying drawings, wherein—

Figure 3 is a vertical section, with parts omitted, through two vessels arranged in tandem;

Figure 4 is a horizontal section, with parts omitted, taken along the line 4—4 of Figure 3;

Figure 5 is a vertical section, with parts omitted, taken along the line 5—5 of Figure 3, looking toward the primary vessel;

Figure 6 is a vertical section, with parts omitted, taken along the line 6—6 of Figure 3, looking toward the secondary vessel;

Figure 7 is a vertical section, with parts omitted, taken along the line 7—7 of Figure 3, looking toward the primary vessel;

Figure 8 is a vertical section, with parts omitted, taken along the line 8—8 of Figure 3 through the primary vessel;

Figure 9 is a vertical section along the line 9—9 of Figure 3, with parts omitted, through the secondary vessel;

Figure 10 is a vertical section, with parts omitted, taken along the line 10—10 of Figure 3, through the middlings discharge chute.

Like parts are indicated by like characters throughout the specification and drawings.

Figures 1, 2 and 3 illustrate generally the arrangement of an apparatus embodying my invention. The primary system is in general indicated by the letter A, the secondary system in general indicated by the letter B on the various sheets of drawings.

Figure 1:
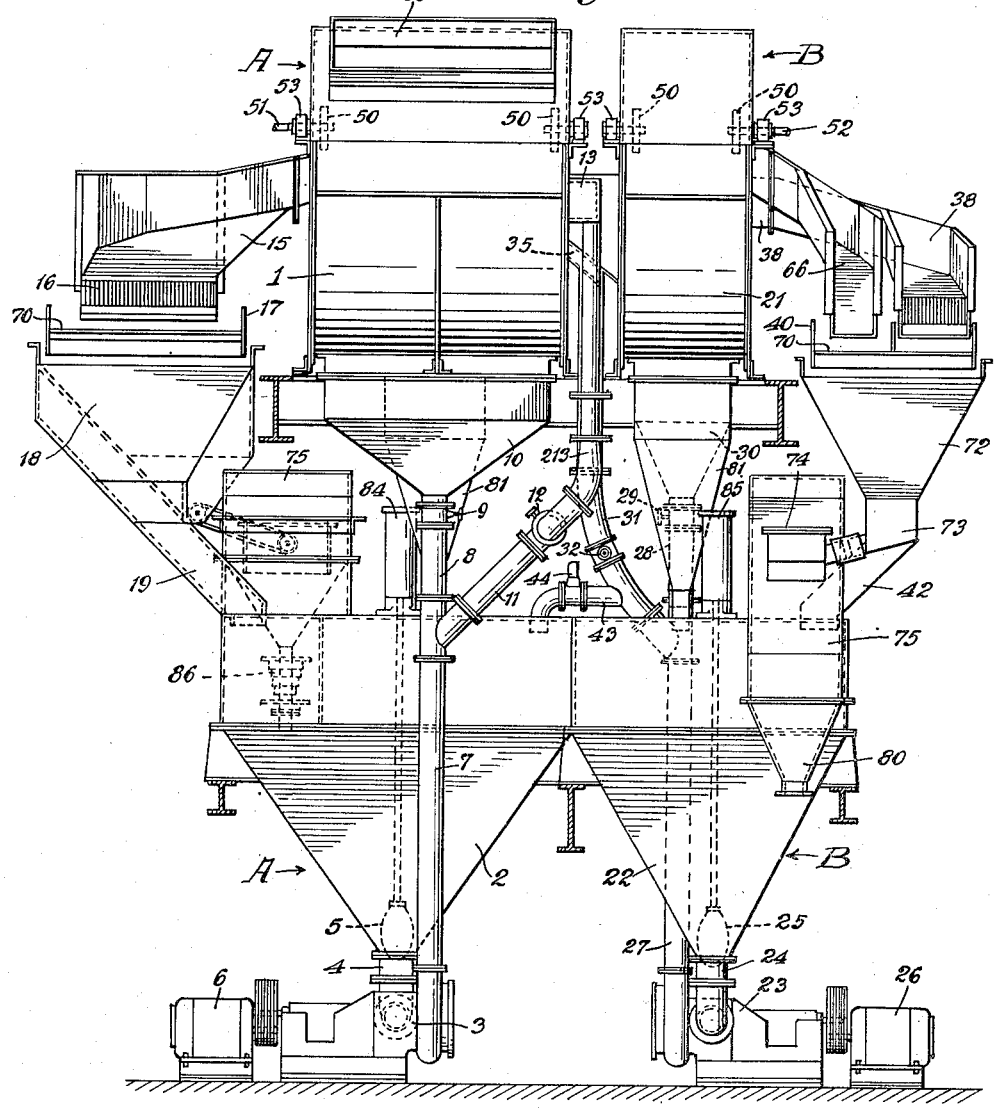
Figure 1 is a side elevation in part section.
Figure 2:
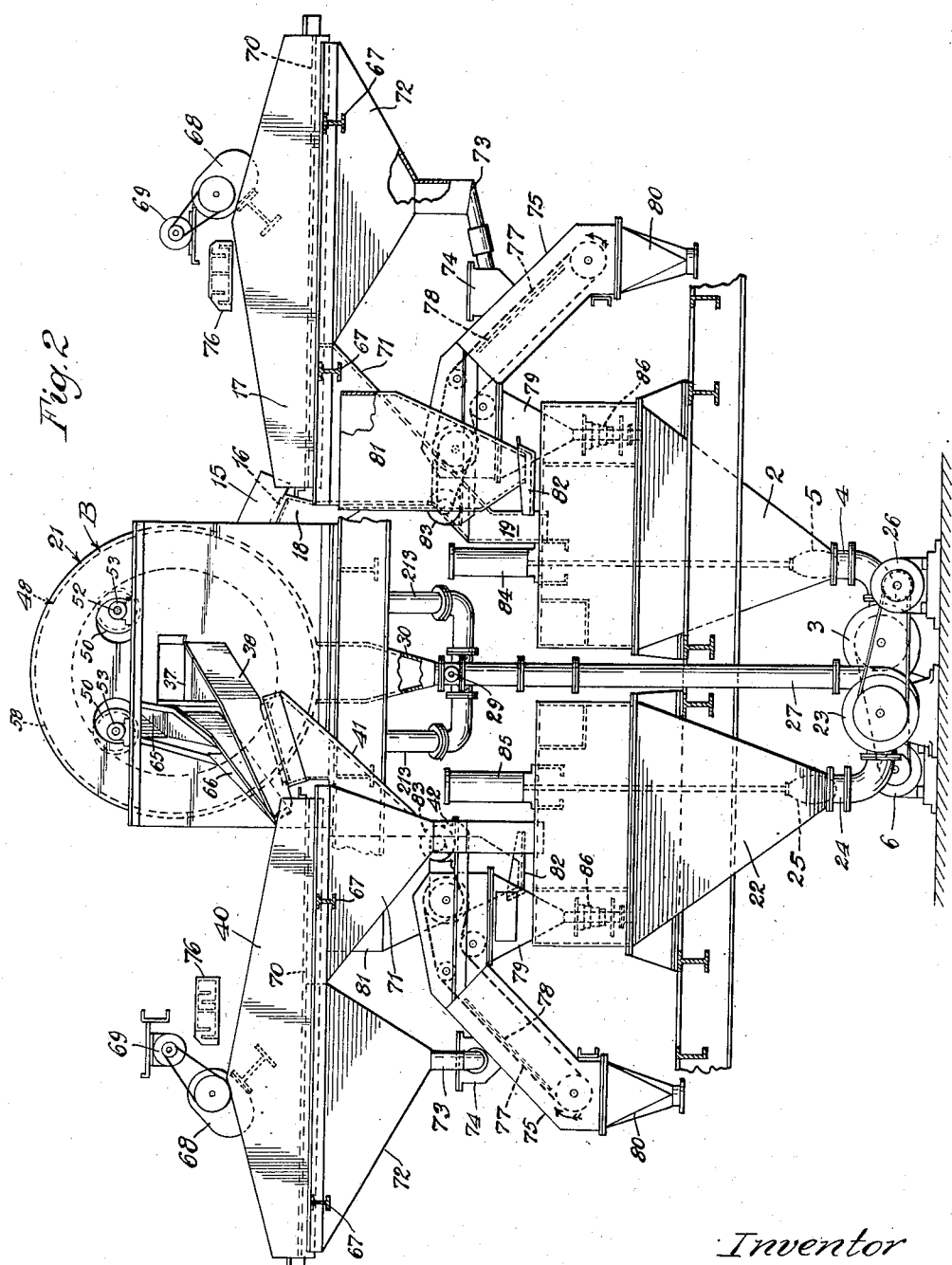
Figure 2 is a side elevation in part section viewed at right angles to Figure 1.

Referring first to the primary system, 1 is the primary vessel, 2 the sump and 3 the pump. The suspension liquid is supplied through the throat 4 controlled by the plug valve 5 to the pump 3, which driven by the motor 6 discharges the suspension through the pipe 7. This pipe has a branch 8 controlled by the valve 9 supplying suspension to the bottom of the vessel 1 through the upward flow diffuser box 10, and a branch 11 controlled by the valve 12 which supplies suspension to the side of the vessel adjacent the level of the bath through the pipes 213 and the cross flow diffuser box 13.

The suspension fluid and the float solids escape from the primary vessel 1 over the weir 14, travel down the chute 15 to the fixed drainage screen 16, the solids going on to the vibrating mechanical dewatering screen 17, the suspension returning direct to the sump 2 through the trough 18 and pipe 19. Thus there is a complete continuous closed circulation system including the primary vessel, its sump and associated propulsion and connecting elements.

The relationship of the parts in the secondary system B is substantially the same. 21 is the secondary vessel, 22 its sump, 23 the pump which receives the suspension through the throat 24 controlled by the plug valve 25. The motor 26 drives the pump 23 to discharge the suspension through the pipe 27, of which branch 28 controlled by the valve 29 to supply liquid to the bottom of the secondary vessel 21 through the upward flow diffuser box 30, branch 31, controlled by the valve 32 supplies cross flow liquid to the secondary vessel through the passage 35 and port 36.

The suspension and the float solids from the secondary vessel 21 escape over the weir 37, pass down the chute 38 to the fixed drainage screen 39, the solids going on to the mechanical dewatering vibrating screen 40, the suspension liquid returning direct to the secondary sump 22 through the trough 41 and pipe 42.

Thus each vessel is a separate element in a separate closed medium circuit which includes also a pump, a sump, conduits and control valves, there being a connection between the two vessels along the chute 63 as will hereinafter appear by which sink material is discharged from the primary vessel directly to the secondary vessel. Another connection between the vessels is by pipe 43 from pipe 31 controlled by the valve 44 whereby medium may be discharged from the higher specific gravity secondary system to the primary system to bring the lower specific gravity in the primary system up to standard.

The valves 9, 12, 32 and 29 may be manipulated to separately control the operation of the two vessels, depending upon the type of product desired, a suitable balance between the upward flow and the cross flow being there effected.

The two vessels are generally similar. Each is cylindrical. Their diameters are preferably the same. In this case, since I have illustrated a device for treating coal where the volume of refuse is comparatively small and where the float is the important recovery the primary vessel is of larger volumetric capacity, being approximately twice as long axially as the secondary vessel. In each case the upward flow diffuser box is closed by a diffuser plate. The box 10 has a plate 45, the box 30, a plate 46. There will usually be a gentle upward flow in each vessel from the diffuser plates extending axially clear across the bottom of each vessel. This flow is usually not sufficient to exert any appreciable upward flow separation. It is ordinarily merely sufficient to maintain the specific gravity or density of the media substantially constant throughout the entire area of the vessel, the flow being, therefore, something more than the normal settling rate of the magnetite in suspension.

Each of the two vessels contains a bucket wheel differing only in that the wheel 47 in the primary vessel is approximately twice as wide as the wheel 48 in the secondary vessel 21. The outer diameter of each wheel is just great enough to clear the periphery of the vessel and the axial width of each wheel is just enough to clear the end of the vessel while leaving room for supporting means therein.

Each wheel includes annular tracks 49 supported on and traveling along a pair of flanged rollers 50, the rollers being supported on shafts 51 and 52, in bearings 53, and driven by motors 54, 55 whereby the wheels are rotated. Each wheel has a plurality of bucket flights 56 perforated at 57 held between annular wheel plates 58, the flights being inclined outwardly and forwardly in the direction of their movement. Fixed circular shrouds 59 extend inwardly from the vessel ends to mask the space between the wheel plates, the ends of the vessels and the tracks.

Referring now more specifically to Figure 8 which is a section through the primary vessel, 60 is a chute through which coal or ore to be treated is fed to the outer periphery of the bucket wheel 47. As the wheel rotates in the direction of the arrow, the buckets positively propel successive batches of solids downwardly below the surface of the bath along the closed curved path defined by the outer periphery of the vessel, the wheel plates 58 and the cylindrical feed or guard plate 61 toward the bottom of the vessel wall. The level of the liquid or bath is fixed by the weir 14. The heavy sink solids are propelled across the diffuser plate 45 at the bottom of the vessel. Since the heavy sink material tends to sink, it precedes the flight bounding the upper side of the batch and is checked in its downward movement by the preceding flight. As these solids reach the bottom of the bath, they tend to be spread across the diffuser plate, being left there by the preceding flight so that they are more or less turned over and agitated and left exposed to the upward current through the diffuser plate. Then as the next flight comes forward, these sink solids are picked up and conveyed upwardly by the wheel flight along the cylindrical guide 62 and finally dropped into the chute 63, the bottom of which is formed by the upper wall of the fluid passage 35. This chute extends downwardly into and so guides the sink solids downwardly into the secondary vessel.

The float material held down by the flight immediately behind it is, as each successive batch reaches the lower edge of the feed plate 61, released and floats upwardly toward the surface of the bath where it is discharged over the weir 14, being urged toward the discharge area by the cross current of liquid entering the vessel near or at the surface of the bath through the diffuser boxes 13.

Referring now to the secondary vessel 21 as illustrated specifically in Figures 3 and 9, the heavy sink material deposited in the chute 63, the walls of which extend above the level of the bath in the primary vessel is washed downwardly along the chute into the secondary vessel 21, the liquids and solids being cataracted downwardly to and below the level of the bath in the secondary vessel by the cross flow medium entering through port 36. The heavy sink solids continue to travel downwardly along the floor or the chute 63 toward the bottom of the secondary vessel where they are deposited on the diffuser plate 46 and thereafter picked up by the bucket flights 56, conveyed upwardly along the cylindrical guide plate 64 and discharged into the refuse hopper 65. Meanwhile, the float material remains at or rises to the surface of the bath and passes out over the weir 37 as a middlings product. The side walls of the chute 63 extending as they do across the vessel 21, assist in guiding the flow of the float material across the vessel toward the weir, it being understood, of course, that the specific gravity of the liquid in the secondary vessel being higher than the liquid in the primary vessel, separates what was sink in the primary vessel into separate sink and float in the secondary vessel.

The sink refuse discharged by the wheel to the hopper 65 is drained as it is elevated above the level of the bath on the perforate bucket flights. This material passes along the chute 66 from the hopper 65 and is discharged to the vibrating dewatering screen 40 which is divided into two parts, one to receive the sink refuse, the other to receive the middlings, the float from the secondary vessel, over the weir. Thus the drained refuse and the middlings are separately screened and dewatered on the vibrating screen 40 and discharged for suitable disposal as the case may be.

The vibrating mechanical dewatering screens 17 and 40 except for differences in size and the fact that one handles only float coal and the other is divided to handle sink refuse and middlings, as well as their associated parts, are identical in purpose as well as in operation and a description of one will suffice for both.

Each vibrating screen 17 and 40 supported by suitable framework 67, vibrated by vibrator 68 driven by motor 69 has a continuous screen fabric 70 extending therealong. Beneath the receiving end of the screen is a hopper 71 which discharges into the pipe 19 or 42 and thence to the associated sump. This part of the screen acts as a draining screen. Thus there is returned to each of the systems, the medium drained from the solids as they are discharged from that system. The solids raised upwardly by the wheel in the primary vessel are only drained as they are conveyed upwardly by the wheel but do not pass over a separate drainage screen. As a result some of the media from the primary vessel enters the secondary vessel with the sink solids from the primary vessel.

Beneath the discharge end of each screen is a hopper 72 which discharges through a pipe 73 and chute 74 to the magnetic separator 75. Wash water is sprayed onto the dewatered material on the screen through a spray pipe 76. This washes from the solids the media adhering to and not drained therefrom. Such wash water flows, as above pointed out to and is treated by the magnetic separator. The magnetic separator 75 includes for example an endless belt 77 traveling in the direction of the arrows along the magnetic element 78. The magnetite in the wash water is held against the belt by this magnetic element and is concentrated and conveyed upwardly by the belt for discharge into the hopper 79 and is returned as a relatively thick concentrate to the proper sump 22 for immediate recirculation through the bath. The wash water and the non-magnetic refuse flows downwardly along the belt into the hopper 80 for discharge.

81 is a hopper for raw magnetite, 82 a control valve therefor, there being one for each of the sumps. 83 is the motor which operates the magnetic separator. 84, 85 are hydraulic cylinders which control the plug valves 5 and 25. 86 is a demagnetizer which may be used, if necessary, to demagnetize the concentrate from the magnetic separator, in those cases where excessive magnetization of the media may occur before return to the bath.

The use and operation of my invention are as follows:

In carrying out my process I propose to use a primary float and sink bottom feed vessel wherein the feed is forced below a surface of the bath before it is released. The sink material will remain at the bottom of the bath until it is removed and discharged as a finished product (pure refuse) by any suitable mechanical means. When the feed is released below the surface of the bath, the float material rises to the surface and is discharged.

By properly adjusting the operation of the vessel, it may be caused to deliver a float product of very high purity, practically no sink material being discharged with the float. Under such circumstances, however, there may perhaps remain a substantial amount of float material entrapped with the sink material.

This sink material including any entrapped float or teeter material is then discharged to a surface feed secondary sink and float vessel. The float material will remain at or if immersed far below the surface will tend to return to the surface and will be discharged from the surface as a middlings product. The sink material will descend, however, and may be separately removed as a final sink product (pure refuse) by any suitable means.

The secondary vessel can be adjusted so as to give an exceedingly pure sink product but under these circumstances, the float will carry off with it a certain amount of entrapped or suspended sink material.

The situation with respect to the two vessels is thus opposite. The first vessel gives an exceedingly pure float coal product and that is what is desired. The second vessel gives an exceedingly pure sink refuse product and the refuse can be thrown away without loss. The second vessel, also gives an intermediate product which will have some float and some sink in it and since that intermediate product may be subsequently treated by other means, no serious loss of coal ensues.

The result of the whole operation is that I am able to get a very satisfactory pure coal without refuse in it, a refuse product without coal in it and an intermediate product including both coal and refuse which can be subsequently treated by any suitable means. For example, the middlings might be crushed and recirculated through the system or treated by other suitable means.

In general, a bottom feed float and sink vessel such as I use tends to give an exceedingly pure float product and a surface feed vessel such as I also use tends to give an exceedingly pure sink product and by using the two in tandem I am able to gain the maximum benefit from each of the two types of vessel and thus produce commercially pure sink, pure float and a middlings product appropriate for retreatment.

There are, of course, many different types of sink and float vessels in existence. The two I have selected are especially satisfactory but the important thing so far as the present invention is concerned is that I bring together two vessels, one producing an especially pure float product, the other producing an especially pure sink product and the combination thus produces a satisfactory middlings product by taking advantage of the especial characteristics of two different types of vessels.

There is a constant circulation of substantially all of the suspension medium, each in its own circulation system. Each sump is only large enough to contain the suspension which drains out of the system when the apparatus is idle. When the apparatus is in operation, the sump contains but a minimum of the suspension liquid sufficient to furnish a supply for the intake of the pump so that the pump will always circulate suspension medium and not air.

I claim:

1. A heavy media sink and float apparatus including a plurality of separate vessels arranged side by side, a separate heavy media circulating system for each vessel, each system including means for forcing liquid into the bottom of the vessel along an upward path and for forcing liquid into each vessel adjacent the surface of the liquid therein along a horizontal path, said latter means being located between the two vessels so that the surface flow in each vessel is outwardly away from the other, a weir in each vessel on the side farthest from the other vessel over which the float material and some of the liquid suspension is discharged.

2. A heavy media sink and float apparatus including a plurality of separate vessels arranged side by side, a separate heavy media circulating system for each vessel, each system including means for forcing liquid into the bottom of the vessel along an upward path and for forcing liquid into each vessel adjacent the surface of the liquid therein along a horizontal path, said latter means being located between the two vessels so that the surface flow in each vessel is outwardly away from the other, a weir in each vessel on the side farthest from the other vessel over which the float material and some of the liquid suspension is discharged, mechanical means for raising sink material from the bottom of the first vessel, above the level of the liquid therein and discharging it directly into the second vessel adjacent the level of the liquid therein.

3. A heavy media sink and float apparatus including a plurality of separate vessels arranged side by side, a separate heavy media circulating system for each vessel, each system including means for forcing liquid into the bottom of the vessel along an upward path and for forcing liquid into each vessel adjacent the surface of the liquid therein along a horizontal path, said latter means being located between the two vessels so that the surface flow in each vessel is outwardly away from the other, a weir in each vessel on the side farthest from the other vessel over which the float material and some of the liquid suspension is discharged, mechanical means for raising sink material from the bottom of the first vessel, above the level of the liquid therein and discharging it directly into the second vessel adjacent the level of the liquid therein, mechanical means in the second vessel for raising sink material above the level of the liquid therein and discharging it from such vessel on the same side as the weir therein.

4. A heavy media sink and float apparatus including a plurality of separate vessels arranged side by side, a separate heavy media circulating system for each vessel, each system including means for forcing liquid into the bottom of the vessel along an upward path and for forcing liquid into each vessel adjacent the surface of the liquid therein along a horizontal path, said latter means being located between the two vessels so that the surface flow in each vessel is outwardly away from the other, a weir in each vessel on the side farthest from the other vessel over which the float material and some of the liquid suspension is discharged mechanical means for raising sink material from the bottom of the first vessel, above the level of the liquid therein and discharging it directly into the second vessel adjacent the level of the liquid therein, the means for supplying the sink material from the first vessel to the second including a hopper extending above the level of the liquid in the first vessel and discharging into the second vessel and means for discharging sink material raised from the bottom of the first vessel into the hopper.

5. A heavy media sink and float apparatus including a plurality of separate cylindrical vessels arranged side by side along a common horizontal axis, the first vessel containing a liquid suspension bath of lower density than the second, a bucket wheel mounted for rotation in each vessel about the horizontal axis thereof, means for feeding solids to the first vessel above the level of the liquid thereof, in the path of the wheel, whereby the wheel positively conveys the solids downwardly through the bath toward the bottom of the vessel, and wherein the float material escapes from the wheel to rise by gravity to the surface of the bath, means within the vessel above the level of the bath to receive the sink material conveyed upwardly by the wheel, a hopper within the first vessel communicating with the second, adapted to receive material discharged from the wheel in the first vessel and feed them into the second vessel adjoining the surface of the bath therein, the upper boundary of the hopper being above the level of the bath in the first vessel, a weir in the end wall of each vessel furthest from the other vessel over which, float solids and some of the suspension is discharged, means within the second vessel above the surface of the bath therein to receive such solids conveyed upwardly by the wheel and to discharge such solids through the end wall of the vessel furthest from the first vessel.

6. The method of sink and float separation of coal and the like which consists in positively forcing the raw material below the surface of a bath of relatively low specific gravity, permitting the float material to rise to the surface and discharging it as a substantially pure finished product, mechanically removing the sink material which includes higher specific gravity as well as pure reject material and discharging it to the surface of a sink and float bath of relatively high specific gravity, permitting the heavy material to sink to the bottom of the bath and mechanically removing it therefrom as a final substantially pure product, discharging the higher specific gravity coal as a float product from the bath for further treatment.

7. The method of treating raw coal and the like which consists in providing a suspension bath, the specific gravity of which is greater than that of some and less than that of other of the raw particles, positively forcing all the particles, downwardly below the surface of the bath, there releasing them to permit upward flotation of the lighter particles, discharging the lighter particles that float freely upwardly as a substantially pure product, mechanically withdrawing the sink particles together which include not only pure sink but also particles consisting of bonded laminations of high and low specific gravity material, respectively, providing a second bath, the specific gravity of which is greater than the specific gravity of the first, feeding the sink product of the first bath to the surface of the secondary bath, wherein the heaviest particles sink to the bottom and are withdrawn therefrom as a substantially pure finished product, discharging the float particles, from the surface of the bath as a middlings product.

References Cited in the file of this patent

UNITED STATES PATENTS

| | | |
|---|---|---|
| Re. 16,674 | Chance | July 12, 1927 |
| Re. 17,873 | Chance | Nov. 18, 1930 |
| 515,542 | Webb | Feb. 27, 1894 |
| 653,340 | Elmore | July 10, 1900 |
| 1,887,239 | Hanson | Nov. 8, 1932 |
| 2,203,601 | Rakowsky et al. | June 4, 1940 |
| 2,373,635 | Wuensch | Apr. 10, 1945 |
| 2,429,436 | Walker | Oct. 21, 1947 |
| 2,482,747 | Davis et al. | Sept. 27, 1949 |
| 2,486,682 | Ridley | Nov. 1, 1949 |
| 2,496,703 | Ekbom | Feb. 7, 1950 |
| 2,516,962 | Davis | Aug. 1, 1950 |
| 2,521,152 | Davis | Sept. 5, 1950 |
| 2,563,332 | Hebbard | Aug. 7, 1951 |

FOREIGN PATENTS

| | | |
|---|---|---|
| 33,861 | Netherlands | May 15, 1934 |
| 584,504 | Great Britain | Jan. 16, 1947 |

OTHER REFERENCES

Quarterly of the Colorado School of Mines, vol. 43, No. 1, January 1948, p. 84.

Rock Products, vol. 53, No. 11, November 1950, p. 53.